United States Patent
Fornoff et al.

(10) Patent No.: US 11,306,969 B2
(45) Date of Patent: Apr. 19, 2022

(54) SINTERING FURNACE FOR COMPONENTS MADE OF SINTERED MATERIAL, IN PARTICULAR DENTAL COMPONENTS

(71) Applicant: DENTSPLY SIRONA Inc., York, PA (US)

(72) Inventors: Peter Fornoff, Reichelsheim (DE); Christian Schmidt, Bensheim (DE)

(73) Assignee: DENTSPLY SIRONA INC., York, PA (US)

( * ) Notice: Subject to any disclaimer, the term of this patent is extended or adjusted under 35 U.S.C. 154(b) by 101 days.

(21) Appl. No.: 15/116,936

(22) PCT Filed: Feb. 12, 2015

(86) PCT No.: PCT/EP2015/053001
§ 371 (c)(1),
(2) Date: Aug. 5, 2016

(87) PCT Pub. No.: WO2015/121364
PCT Pub. Date: Aug. 20, 2015

(65) Prior Publication Data
US 2017/0176103 A1    Jun. 22, 2017

(30) Foreign Application Priority Data
Feb. 12, 2014  (DE) ............... 10 2014 202 575.3

(51) Int. Cl.
*F27B 17/02*    (2006.01)
*A61C 13/20*   (2006.01)

(52) U.S. Cl.
CPC ........... *F27B 17/025* (2013.01); *A61C 13/20* (2013.01); *F27B 17/02* (2013.01)

(58) Field of Classification Search
CPC ........ F27B 17/025; F27B 17/02; A61C 13/20
See application file for complete search history.

(56) References Cited

U.S. PATENT DOCUMENTS 7,767,942 B2 *  8/2010  Stephan ............... C04B 35/42
                                                     219/679
10,182,891 B2   1/2019  Brotzge
(Continued)

FOREIGN PATENT DOCUMENTS

DE         4303458 C1    1/1994
DE         4302570 C1    3/1994
(Continued)

OTHER PUBLICATIONS

Kim et al. ("High-Frequency Induction Heat Sintering of Mechanically Alloyed Alumina-Yttria-Stabilized Zirconia Nano-Bioceramics", J. Am. Ceram. Soc. 89[4] 1280-1285 (Apr. 2006)) (Year: 2006).*

(Continued)

*Primary Examiner* — Robert J Grun
(74) *Attorney, Agent, or Firm* — Dentsply Sirona Inc.

(57) ABSTRACT

The invention relates to a sintering furnace (1) for components (15) made of a sintered material, in particular for dental components, comprising a furnace chamber (2) having a chamber volume (VK), wherein a heating device (5), a receiving space (9) having a gross volume (VB) located in the chamber volume (VK) and delimited by the heating device (5), and a useful region (10) having a useful volume (VN) located in the gross volume (VB), are disposed in the furnace chamber (2). The furnace chamber (2) has an outer wall (3) consisting of a plurality of walls having a wall portion (7) to be opened for introduction of a component to be sintered having an object volume (VO) into the receiving space (9). In the furnace chamber (2) the heating device (5) has a thermal radiator (6) having a radiation field (13) which is disposed on at least one side of the receiving space (9). At least the useful volume (NV) disposed in the receiving space (9) is disposed in the radiation field (13) of the radiator (6), wherein the maximum possible distance (d) of the compo- (Continued)

nent (15) to be sintered from the radiator (6) corresponds to at most twice the dimension ($D_y$) of the maximum useful volume (VN).

9 Claims, 4 Drawing Sheets

(56) References Cited

U.S. PATENT DOCUMENTS

| | | |
|---|---|---|
| 2009/0079101 A1 | 3/2009 | Laubersheimer |
| 2009/0225806 A1 | 9/2009 | Lorunser |
| 2010/0025394 A1 | 2/2010 | Jussel |
| 2010/0047731 A1 | 2/2010 | Zubler |
| 2011/0006450 A1 | 1/2011 | Stephan |
| 2011/0114626 A1 | 5/2011 | Serrago |
| 2012/0118875 A1 | 5/2012 | Jussel |
| 2012/0267830 A1 | 10/2012 | Maginnis |

FOREIGN PATENT DOCUMENTS

| | | |
|---|---|---|
| DE | 19754077 A1 | 6/1999 |
| DE | 19824497 A1 | 12/1999 |
| DE | 202011003179 U1 | 4/2012 |
| WO | 2013068312 A1 | 5/2013 |
| WO | 2014016320 A1 | 1/2014 |

OTHER PUBLICATIONS

Opposition of Amann Girrbach AG (EP 31322017); Dec. 7, 2018.
Opposition of Dekema Dental-Keramikofen GmbH (2015EP-0709421; EP31322017); Jan. 3, 2019.
Opposition of Ivoclar Vivadent AG (2015EP-0709421; EP31322017); Jan. 2, 2019.
International Preliminary Report on Patentability (IPRP) Chapter II; PCT/EP2015/053001; Jan. 19, 2016 completed).
International Search Report; PCT/EP2015/053001; Apr. 15, 2015 (completed); dated Apr. 29, 2015.
Written Opinion of the International Searching Authority; PCT/EP2015/053001; Apr. 15, 2015 (completed); dated Apr. 29, 2015.

* cited by examiner

SINTERING FURNACE FOR COMPONENTS MADE OF SINTERED MATERIAL, IN PARTICULAR DENTAL COMPONENTS

TECHNICAL FIELD

The invention relates to a sintering furnace for components made of sintered material, in particular for dental components and in particular for components made of ceramic, comprising a furnace chamber having a chamber volume, wherein a heating device, a receiving space having a gross volume located in the chamber volume delimited by the heating device, and a useful region with a useful volume located in the gross volume are disposed in the furnace chamber, and wherein the furnace chamber has an outer wall consisting of a plurality of walls with a wall portion to be opened in at least one of the walls for introduction of a component to be sintered having an object volume, into the receiving space.

BACKGROUND OF THE INVENTION

The material to be sintered is critical for the configuration of a sintering furnace. Basically metallic or ceramic shapes are sintered, which are pressed from a powder and if necessary are further processed either directly or by milling or grinding after a sintering-on process. The material determines the necessary temperature profile. The size and quantity of components determines the size of the furnace and also the temperature profile. The hotter the furnace needs to be, the thicker the walls of insulation need to be. The size of the furnace, the components and the desired heating rate determine the design of the heating system and the control behavior. The power supply also plays a role. Ultimately, the size and also the power supply available cause a dental furnace for a laboratory to differ from an industrial sintering furnace.

Heat treatment processes, particularly, the complete sintering of dental restorations from pre-sintered ceramics or metals while using a sintering furnace, typically lasts between 60 minutes and several hours. The process by which a dental restoration is manufactured, which requires both preparatory and follow-up steps, is interrupted for lengthy periods by this time requirement of a single step. Thus, so-called speed sintering for zirconium oxide requires a minimum of 60 minutes.

So-called super-speed sintering for zirconium oxide currently requires only a minimum of 15 minutes of process run-through time. True, this does presume that the sintering furnace, especially due to its weight, and the intended holding temperature, be preheated, which lasts from 30 to 75 minutes, depending on the available system voltage. Additionally, after preheating, the furnace must be loaded by an automatic loading sequence, so that special temperature profiles can be maintained and the furnace does not cool down unnecessarily.

However, one drawback of the pre-heating and subsequent loading is that the furnace, and especially its insulation and its heating elements are subjected to high thermal cyclic loading, which tends to reduce the service life of the device.

Therefore, the goal of the present device consists in making available a sintering furnace that makes possible an appropriately short manufacturing time, without preheating of the sintering furnace and/or a special loading sequence being necessary.

SUMMARY OF THE INVENTION

This goal is achieved by a sintering furnace for components made of a sintering material, especially for dental components and especially for components made of ceramic, which comprises a chamber volume and in which a heating device, a receiving space and a useful region are disposed. The receiving space occupies a gross volume situated in the chamber volume and delimited by the heating device. The useful region has a useful volume and is in the receiving space. Further, the furnace chamber has an outer wall consisting of a plurality of walls, having at least one wall portion to be opened for insertion of a component with an object volume to be sintered into the receiving space. The heating device in the furnace chamber has at least one thermal radiator having a radiation field, which is disposed on at least one side of the receiving space and in the radiation field of which at least the useful volume of the useful region is disposed. The maximum possible distance of the component to be sintered to the radiator corresponds at most to twice the dimension of the maximum useful volume.

The furnace chamber, also called combustion chamber, forms the part that receives and heats the component to be sintered, thus the core of the sintering furnace. The entire volume enclosed by the furnace chamber is designated as the chamber volume. The free space remaining between the heating device disposed in the furnace chamber can receive the component to be sintered and therefore is designated as the receiving space. The volume of the receiving space is derived essentially from the width and height in the clear between the heating device and possibly the chamber walls and is therefore designated as the gross volume.

Designated as the useful region is the region of the sintering furnace in which the temperature necessary or desired for the sintering process is reached by the heating device. Thus the useful region is the region in which the radiation field generated by the thermal radiator has the requisite intensity and/or homogeneity for the sintering process, and in which the component is positioned for sintering. This useful region thus derives in essence from the radiation field or the disposition of the heating device and its reflection characteristics, and can be correspondingly smaller than the gross volume. For a successful sintering process, the object volume of the object to be sintered should therefore at most have the size of the useful volume. On the other hand, for sintering processes that are as rapid and efficient as possible, the size of the useful volume should at maximum have the size of an upper estimate of the volume of object volume to be sintered.

Should the furnace be able to usable for sintering objects of varied size, for example for sintering of individual tooth crowns and also of bridges, then it can be advantageous to configure the radiator of the heating device to be mobile, so that the size of the receiving space, thus the gross volume, as well especially as the size of the useful region, thus the useful volume, is adaptable to the size of the object.

However, the useful volume can also be reduced by making the useful region smaller and adapting to the object size. For example, with an insulated door insert, a part of the receiving space can be blocked out. Through an optimally good utilization of the gross volume, thus a maximum possible useful volume in relation to the gross volume, during the sintering process the volume to be heated can be kept as small as possible, through which rapid heating and especially obviating a preheating process is possible.

Dental objects typically are of sizes from only a few millimeters to centimeters, so that correspondingly a useful volume in the range from centimeters typically suffices. For individual tooth restorations to be sintered, like crowns and caps, a useful volume of 20×20×20 mm³ can for example be sufficient. For larger dental objects such as bridges, a useful volume of 20×20×40 mm³ can suffice. The dimensions of the useful volume (VN) can then advantageously be 20 mm×20 mm×40 mm at most. Correspondingly, the maximum possible distance of the component to be sintered from the radiator for a dental sintering furnace can for example be limited or secured to 20 mm.

Advantageously the useful volume is in a ratio to the chamber volume of from 1:50 to 1:1, and to the gross volume of the receiving space in a ratio of from 1:20 to 1:1.

The smaller the volumes and the smaller the weight that overall has to be heated, the more quickly a desired temperature can be reached in the furnace chamber or in the useful region, and the sintering process can be carried out successfully. For example, the chamber volume of the furnace chamber can be 60×60×45 mm³ and the gross volume 25×35×60 mm³.

Advantageously, the useful volume for the component to be sintered is in a ratio to the object volume of the component to be sintered from 1500:1 to 1:1.

The smaller the difference between the useful volume of the useful region and the object volume of the component to be sintered, the more speedily and energy-efficient the sintering process can be carried out for the component.

Advantageously the outer wall has a chamber inner wall that is impermeable and/or reflective for the radiation field, which especially has a reflective coating or is configured as a reflector.

Through a reflective coating, the intensity of the radiation field of the radiator in the useful region, thus within the useful volume, can be increased. If the radiator is disposed only on one side of the receiving space, then for example by means of a reflecting coating placed opposite, or a reflector placed opposite, a more homogeneous and/or more intense radiation field can be attained in the useful region.

Advantageously, the heating device has a heating element with a heating rate in the useful region of at least 200 K per minute at 20° C.

Advantageously, the heating element is able to undergo resistive or inductive heating.

Inductive or resistance heated elements represent simple embodiment versions of a heating element of a sintering furnace.

Advantageously, the radiator can be configured as a crucible, because here the useful volume can correspond to the gross volume.

BRIEF DESCRIPTION OF THE DRAWINGS

The invention will be explained with reference to the drawing. In the figures.

DETAILED DESCRIPTION OF THE INVENTION

Exemplary Embodiment

Figure 1:
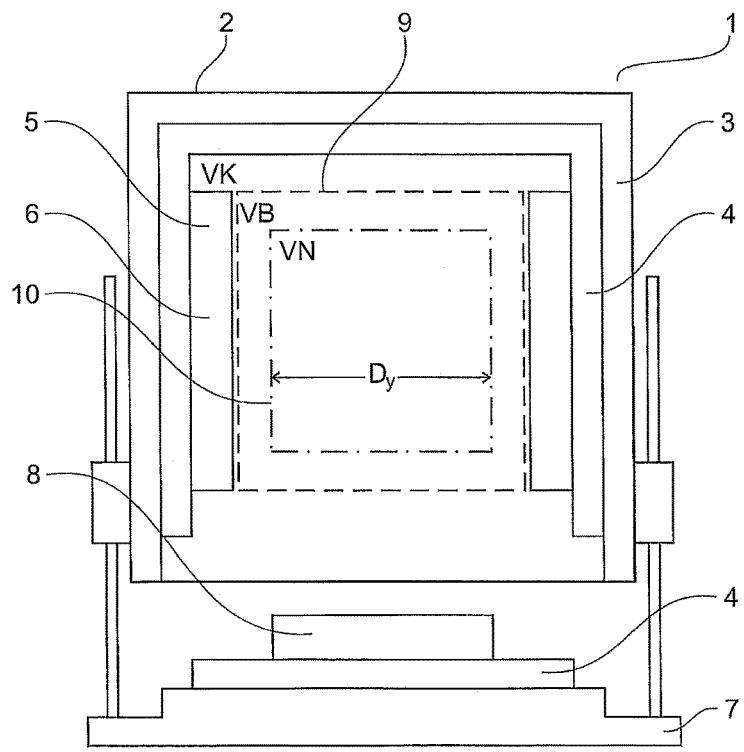
FIG. 1: a part of an invention-specific sintering furnace for components made of a sintered material, especially for dental components.

FIG. 1 shows a part of a sintering furnace 1, which has a furnace chamber 2 with a chamber volume VK, the walls 3 of which are provided with insulation 4 for screening the hot furnace chamber 2 against the environment. For heating the furnace chamber 2, in furnace chamber 2 a heating device 5 is disposed with two thermal radiators 6. The furnace chamber 2 has a wall portion 7 to be opened for insertion of a component 15 to be sintered into the furnace chamber 2, which here is the lower wall portion, thus the bottom of the furnace chamber 2. The bottom 7 likewise has insulation 4, on which a base 8 for the component 15 to be sintered is placed, which also is designated as a support 8. Also eligible are cross pieces or a crucible or vertically placed pins made of ceramic or high-melting metal, on which the component 15 is placed.

Through the heating device 5 or the thermal radiator 6, which for example in FIG. 1 is disposed on two sides of the furnace chamber 2, within furnace chamber 2 there results a free volume that is less as compared to the chamber volume VK, which is indicated in FIG. 1 with a dashed line and is designated as the gross volume VB. The space that this gross volume VB assumes, is the receiving space 9, into which an object 15 to be sintered can be inserted.

Using the radiator 6 of the heating device 5, the receiving space 9 is heated, wherein at least one part of the gross volume VB of the receiving space 9 is heated in sufficiently robust and uniform fashion. This region is designated as the useful region 10 and the volume as the useful volume VN. The useful area 10 is schematically depicted with a dot-and-dash line and a second largest dimension of the useful region 10 drawn in as $D_y$. The size and position of the useful region 10 is determined in essence by the reflection characteristics, thus the radiation field 13, and the arrangement of the radiator 6, wherein a placement of the radiator 6 on at least one side of the receiving space 9, ensures that the useful region 10 lies within the receiving space 9.

Figure 2A:
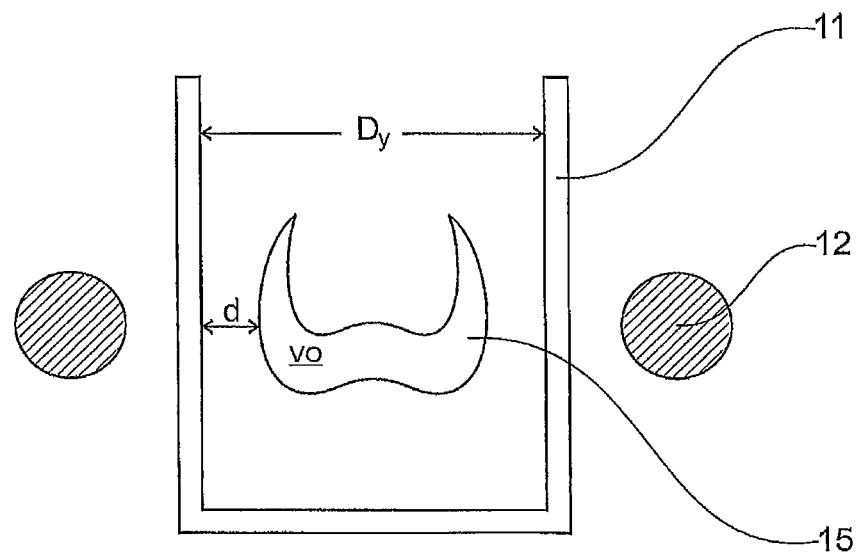
FIGS. 2A, B an inductively heatable heating device with a radiator consisting of a crucible and coil.
Figure 2B:
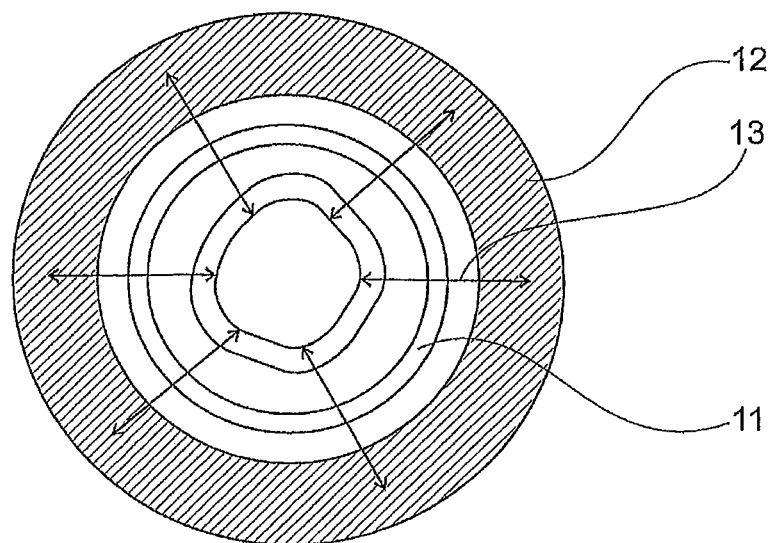

The object 15 to be sintered can for example be resistively or inductively heated. In FIGS. 2A and 2B for example, an inductively heated radiator 6 is depicted as a heating device 5. The radiator 6 is configured as a crucible 11, for example made of MoSi2 or SiC, with at least one encircling coil 12 for inductive heating, wherein the reflection of the crucible 11, thus the thermal radiation 13, is indicated by arrows. In this example, the receiving space 9 is formed by the inner space of the crucible. The useful region 10 is likewise in the inner space of the crucible 11, wherein the ratio of the usable volume VN of the usable region 10 to the gross volume VB of the receiving space 9 is 1:1.

The component 15 to be sintered is disposed in the inner space of crucible 11, in the receiving space 9 that coincides with the useful region 13. The distance of the object to the radiator 6, thus to the crucible 11 here, is designated as d.

Figure 3:
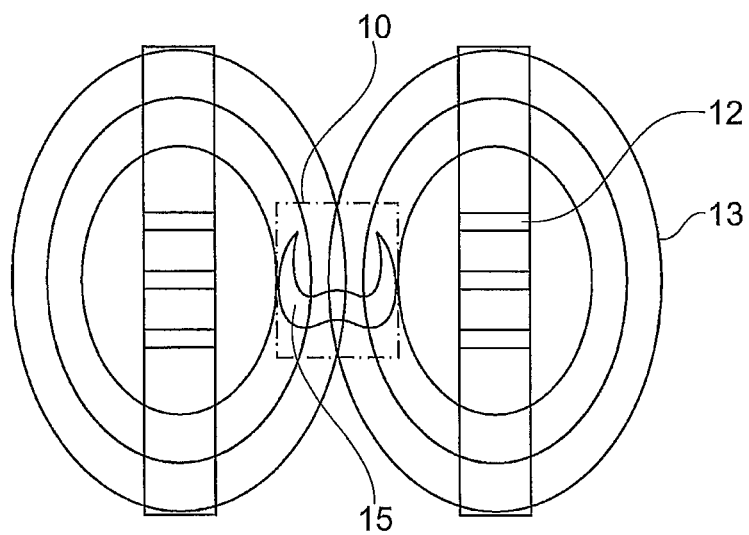
FIG. 3: a plate-shaped inductively heatable thermal radiator having an integrated coil.

FIG. 3 shows a thermal radiator 6 formed from two plate-shaped elements, which is heated by means of integrated coils 12. The receiving space 9 correspondingly is situated between the two plate-shaped elements FIG. 3 further shows the radiation field 13 of the thermal radiator 6 with lines. There is disposed appropriately in receiving space 9 a useful region 10, which covers an area of the radiation field 13 as homogeneously as possible with high intensity.

Figure 4A:
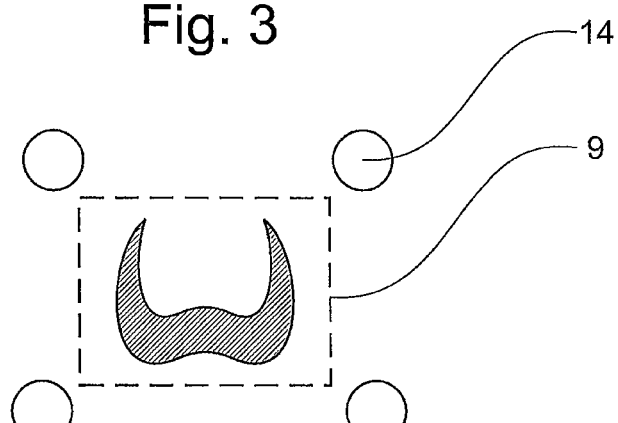
FIGS. 4A, B resistance heating devices with thermal radiators consisting of rod-shaped heating elements.
Figure 4B:
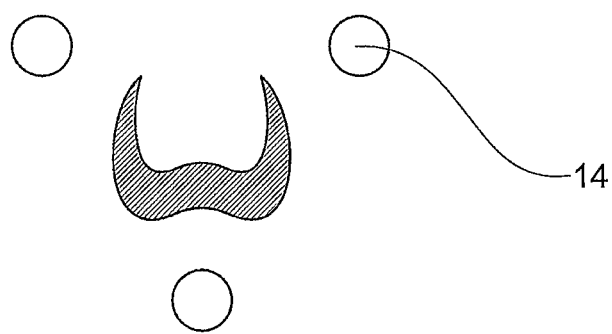

The thermal radiators 6 depicted in FIGS. 4A and 4B consist of three and four rod-shaped resistance heating elements 14, respectively.

Figure 8:
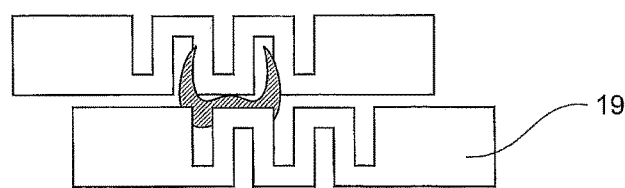
FIG. 8 a thermal radiator consisting of planar heating elements.
Figure 5:
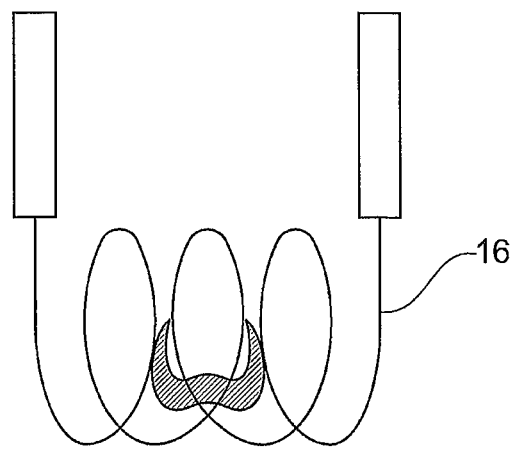
FIG. 5 a heating coil as a resistance heating element.
Figure 6:
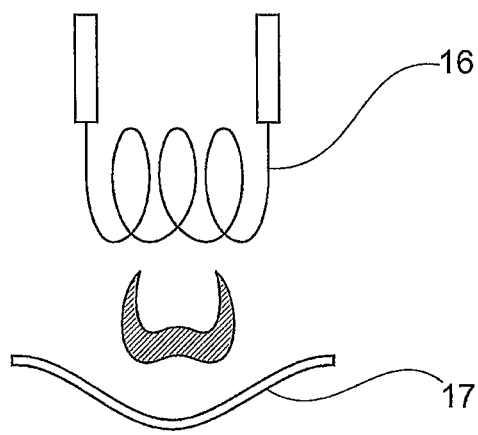
FIG. 6 a thermal radiator consisting of heating coil and reflector.
Figure 7:
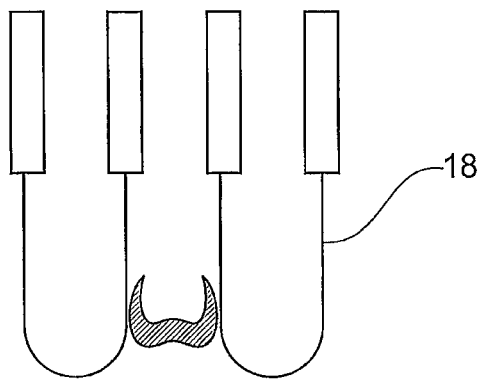
FIG. 7 a thermal radiator consisting of U-shaped heating elements.

Additional variants of resistive thermal radiators 6 and arrangements are shown in FIGS. 5 to 8. The radiator 6 shown in FIG. 5 is configured as a heating coil 16, wherein the receiving space 9 and useful region 10 are cylinder-shaped and disposed within the heating spiral. In FIG. 6 the radiator 6 is a combination of a thermal radiator, here a heating coil 16 and the reflector 17, wherein the receiving space 9 and useful region 10 are found between the heating spiral 16 and reflector 17. FIG. 7 shows a radiator consisting of two U-shaped heating elements 18 having a receiving space 9 disposed between the two U-shaped heating elements 18. In FIG. 8 a radiator 6 consisting of two planar heating elements 19 is depicted. These typically have a planar reflection pattern, through which the useful region occupies an especially large part of the receiving space 9 lying between the planar heating elements 19.

LIST OF REFERENCE SYMBOLS

1 Sintering furnace
2 Furnace chamber
3 Walls
4 Insulation
5 Heating device
6 Thermal radiator
7 Wall portion
8 Base
9 Receiving space
10 Usable region
11 Crucible
12 Coil
13 Radiation field
14 Rod-shaped resistance heating elements
15 Object to be sintered
16 Heating coil
17 Reflector
18 U-shaped heating elements
19 Planar heating elements
D Distance
$D_y$ Second largest dimension
VB gross volume
VK chamber volume
VN useful volume
VO object volume

The invention claimed is:

1. A dental sintering furnace for one or more ceramic dental components to be sintered, comprising:
a furnace chamber with a chamber volume, the furnace chamber further including;
a heating device disposed within said chamber volume,
a receiving space disposed within said chamber volume and having a gross volume, said receiving space delimited by the heating device,
and a useful region with a useful volume disposed within the receiving space;
wherein the furnace chamber has an outer wall that includes a plurality of walls, and that has at least one wall portion, said at least one wall portion constructed to be opened for introduction of the one or more ceramic dental components into the receiving space, said one or more ceramic dental components having an object volume;
wherein the heating device has a radiator with a direct radiation field, said radiator disposed on at least one side of the receiving space;
wherein the useful volume is further configured to be disposed in the direct radiation field;
wherein the dental sintering furnace is constructed such that a ratio of the useful volume to the chamber volume is from 1:50 to 1:1 and a ratio of the useful volume to the gross volume is from 1:20 to 1:1 such that a maximum possible useful volume in relation to the gross volume is kept as small as possible so as to eliminate a need for a preheating of the dental sintering furnace and provide a relatively fast sintering of the one or more ceramic dental components as compared conventional furnaces, and
wherein the radiator is configured to be heated in an inductive fashion using an encircling coil,
wherein the radiator is made of SiSiC,
wherein the useful volume is at most 20×20×40 $mm^3$.

2. The dental sintering furnace according to claim 1, wherein the dental sintering furnace is constructed such that a ratio of the useful volume to the object volume is from 1,500:1 to 1:1.

3. The dental sintering furnace according to claim 1, wherein the outer wall has a chamber inner wall that is impermeable to the direct radiation field and/or reflects it.

4. The dental sintering furnace according to claim 1, wherein the useful volume is at most 20×20×40 $mm^3$ and that the dimensions of the useful volume are at most 20 mm×20 mm×40 mm.

5. The dental sintering furnace according to claim 1, wherein the radiator is configured as a crucible.

6. The dental sintering furnace according to claim 1, wherein the radiator is formed from two plate-shaped elements, which are heated by integrated coils and wherein the receiving space is configured to be between the two plate-shaped elements.

7. The dental sintering furnace according to claim 1, wherein the radiator heated in an inductive fashion comes into direct contact with the one or more ceramic dental components during sintering.

8. The dental sintering surface according to claim 1, wherein the dental sintering furnace includes an active water cooling inside the encircling coil.

9. The dental sintering furnace according to claim 1, wherein the radiator is capable of achieving heating rates above 150° C./min.

* * * * *